United States Patent
Sann et al.

(10) Patent No.: US 9,808,749 B2
(45) Date of Patent: Nov. 7, 2017

(54) DEVICE FOR THE SUCTION FILTRATION OF FLUIDS

(71) Applicant: Hydac Filtertechnik GmbH, Sulzbach/Saar (DE)

(72) Inventors: Norbert Sann, Riegelsberg (DE); Viktor Josef Lauer, Nalbach (DE); Stefan Hennes, Hangard (DE); Michael Sakraschinsky, St. Ingbert (DE); Alexander Wohlers, Saarburg (DE); Paul Seibold, Grainau (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 196 days.

(21) Appl. No.: 14/424,211

(22) PCT Filed: Jul. 25, 2013

(86) PCT No.: PCT/EP2013/002207
§ 371 (c)(1),
(2) Date: Feb. 26, 2015

(87) PCT Pub. No.: WO2014/032752
PCT Pub. Date: Mar. 6, 2014

(65) Prior Publication Data
US 2015/0202553 A1    Jul. 23, 2015

(30) Foreign Application Priority Data
Aug. 31, 2012  (DE) .................. 10 2012 017 288

(51) Int. Cl.
    B01D 35/00    (2006.01)
    B01D 35/027   (2006.01)
    F01N 3/20     (2006.01)

(52) U.S. Cl.
CPC ......... *B01D 35/005* (2013.01); *B01D 35/027* (2013.01); *F01N 3/2066* (2013.01);
(Continued)

(58) Field of Classification Search
USPC ....................................... 210/416
See application file for complete search history.

(56) References Cited

U.S. PATENT DOCUMENTS

| 7,243,659 B1* | 7/2007 | Lecoultre | A24C 5/476 |
|---|---|---|---|
| | | | 131/331 |
| 2005/0160806 A1* | 7/2005 | Yoshioka | G01F 23/0038 |
| | | | 73/305 |
| 2013/0025269 A1* | 1/2013 | Hodgson | F01N 3/2066 |
| | | | 60/317 |

FOREIGN PATENT DOCUMENTS

| DE | 10 2009 029 400 A1 | 3/2011 |
|---|---|---|
| DE | 10 2010 014 314 A1 | 10/2011 |

(Continued)

*Primary Examiner* — Chester Barry
(74) *Attorney, Agent, or Firm* — Wenderoth, Lind & Ponack, L.L.P.

(57) ABSTRACT

A device for the suction filtration of fluids, such as urea solutions for exhaust gas after-treatment systems, has a tank (2) storing the fluid, and a filter element (34) arranged in the tank and provided with a filter medium (32) separating the tank contents from a clean-side inner filter cavity (20). The filter cavity extends from the bottom (10) of the tank (2) to a filling level height (28) and corresponds to a part of the filling volume of the tank (2). On the filter cavity (20), a suction connection (22) discharges the cleaned fluid by a suction pressure corresponding to a system operating pressure. The filter element (34) is provided with a filter medium (32), which is air-impermeable if suction pressures are within the range of a low system operating pressure.

14 Claims, 2 Drawing Sheets

(52) U.S. Cl.
CPC .. *F01N 2610/02* (2013.01); *F01N 2610/1426* (2013.01); *Y02T 10/24* (2013.01)

(56) References Cited

FOREIGN PATENT DOCUMENTS

| | | |
|---|---|---|
| EP | 1 510 392 A2 | 3/2005 |
| EP | 2 453 115 A1 | 5/2012 |
| WO | WO 2011/124637 A1 | 10/2011 |

\* cited by examiner

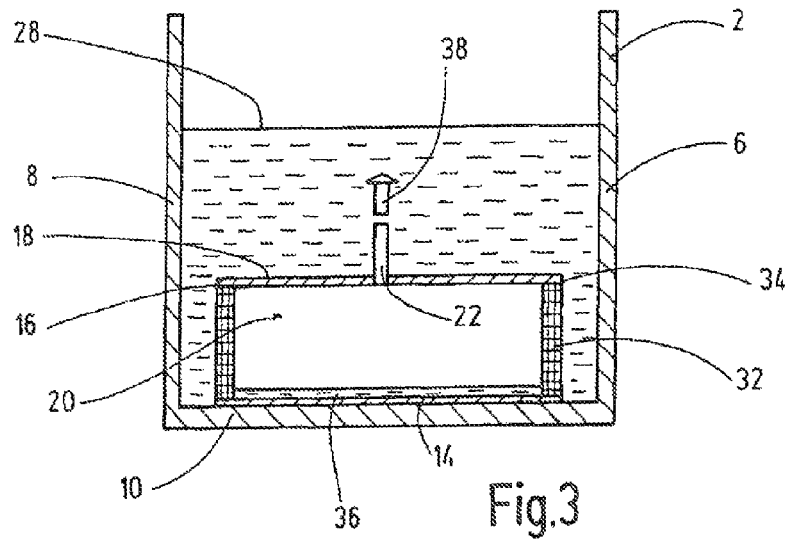
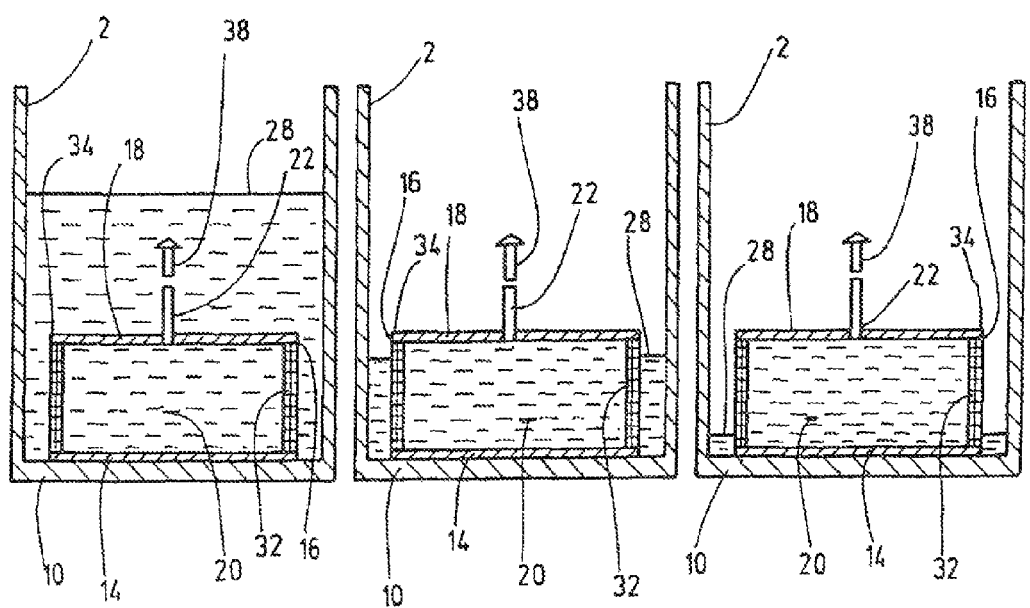

DEVICE FOR THE SUCTION FILTRATION OF FLUIDS

FIELD OF THE INVENTION

The invention relates to a device for the suction filtration of fluids, such as urea solutions for exhaust gas aftertreatment systems. The device comprises a tank storing the fluid, and a filter element arranged therein. The filter element is provided with a filter medium, which separates the tank contents from a clean-side inner filter cavity and extends from the bottom area of the tank to a filling level height, which inner filter cavity corresponds to a part of the filling volume of the tank. A suction connection is provided on the filter cavity. Via the suction connection, the cleaned fluid can be discharged by a suction pressure corresponding to a system operating pressure. The invention further relates to a filter element provided for use with such a device.

BACKGROUND OF THE INVENTION

Devices for the suction filtration of fluids, such as liquid operators, fuels or the like, are used in widely different fields. Due to the increasing requirements related to the emission behavior of internal combustion engines, there has been an increased use more recently of exhaust gas aftertreatment systems with which for a selective catalytic reduction of nitrogen oxides, an aqueous urea solution is stored in a tank and is injected into an exhaust gas stream, in order, in conjunction with an SCR catalytic converter, to extract ammonia as the actual reducing agent. The urea solution can be obtained under the trade name "Adblue" at gas stations as an additional operating fluid for motor vehicles, for filling the respective storage tank. High demands are placed on the purity of the urea solution for the operational safety of the associated injector system. Impurities can lead to blockages of channels and/or dosing pumps and/or valves in the injector system.

Because the urea solution provided for filling can contain different impurities, and because, in particular, the danger also exists that during the filling process a quantity of contaminant may be introduced into the tank, filtering is necessary to clean the urea solution which is drawn from the tank.

For this purpose, a device of the aforementioned kind is known from WO 2011/124637 A1, in which the filter element serving as a suction filter is integrated into the tank storing the urea solution. The operating behavior of this device is not optimal for use in motor vehicles. Thus, the safe operation of the system depends on the filling level height in the tank not falling below the upper edge of the filter medium of the filter element. As soon as this is the case, there is the danger that air is suctioned out of the tank via the unused, i.e. exposed, part of the filter medium, and passes into the system. For a useful operation of motor vehicles, however, the filling level height must be able to be lowered down to the bottom area of the tank, in order in this way to remove a large fill quantity from the tank.

SUMMARY OF THE INVENTION

An object of the invention is to provide an improved device for suction filtration which, with a filter element integrated in the respective tank, is distinguished by a highly favorable operating behavior.

This object is basically achieved according to the invention by a device having, as an essential feature of the invention, a filter element with a filter medium, which is air-impermeable if suction pressure lies within the range of a low system operating pressure. This air-impermeability avoids the danger that, as soon as the filling level in the tank has fallen below the level of the upper edge of the filter medium, such that a part of the filter medium above the fluid level is exposed, air is suctioned out of the tank via the filter medium into the clean-side inner filter cavity. Without the entry of air, practically the entire volume of the tank surrounding the filter element can be used.

In particularly advantageous exemplary embodiments of the invention, the suction connection on the filter cavity is disposed at the upper end thereof remote from the tank bottom. This arrangement not only eliminates the problem that during ongoing operation, air could be suctioned in when the fill level falls below the upper edge of the filter element, but furthermore also guarantees a particularly safe start-up of the system after periods of downtime. Because the filter medium is not air permeable, air initially located within the filter cavity of the filter element does not escape as the tank is filled. During startup of the pump, the quantity of air contained in the filter element is discharged via the head-side suction connection. Because no urea solution is also discharged with this process, the quantity of air can be eliminated using normal ventilation processes, for example self-actuated pump venting, after which the system is ready to operate free of air. This ventilation process can occur automatically after filling processes.

An air-impermeable filter medium for the pressure gradient in question can be formed from a melt-blown fiber material. The plastic fibers made, in particular, of PA 66, can be provided.

In particularly advantageous exemplary embodiments, a filter medium is provided having a wall thickness in the range of 5 mm and a filter fineness in the range of 10 µm. In the case of filter media constructed in such a manner, the filter medium, as a result of the capillary effect, is completely suctioned full with the relevant fluid, even if parts of the filter medium lie above the fill level. The filter medium is then air-impermeable for low suction pressures over the entire height thereof.

The subject matter of the invention also includes a filter element, which is provided for use with a device for suction filtration.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is a highly simplified, functional side view in section of a device according to an exemplary embodiment of the invention for suction filtration, in an operating state before start-up;

FIG. 4 is a highly simplified, functional side view in section of the exemplary embodiment of the invention, in a state after start-up; and FIGS. 5 and 6 are highly simplified side views in section of the exemplary embodiment of the invention in states with fill level heights in the tank lowered to different degrees.

DETAILED DESCRIPTION OF THE INVENTION

Figure 1:
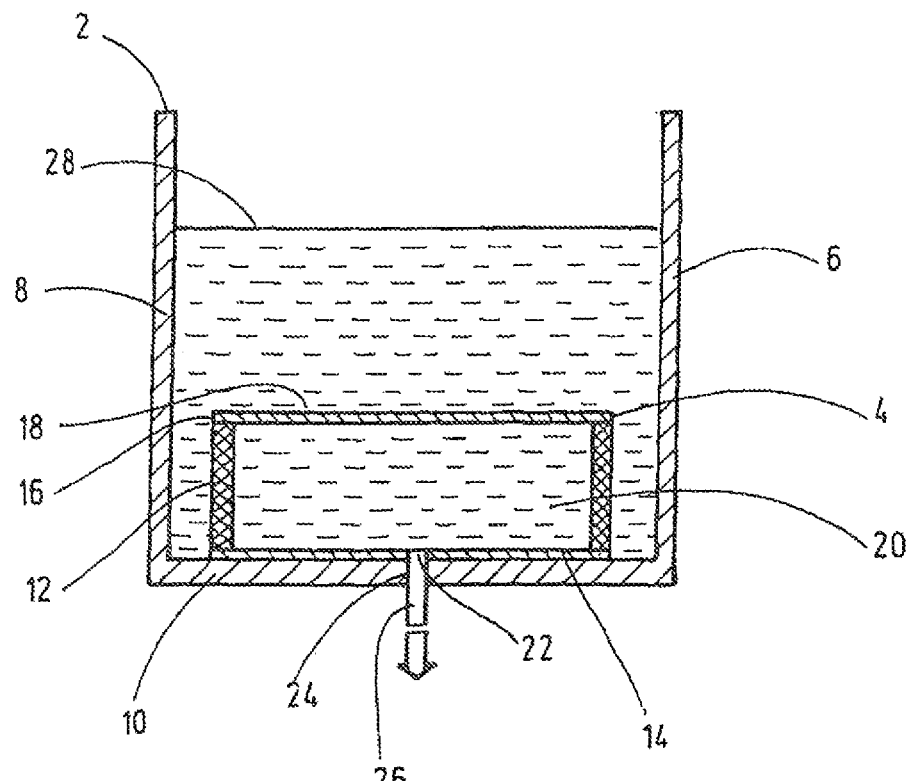
FIG. 1 is a highly simplified, functional side view in section of a device according to the prior art for suction filtration of a urea solution, wherein the filling level height in the associated tank lies above the upper edge of the filter element.
Figure 2:
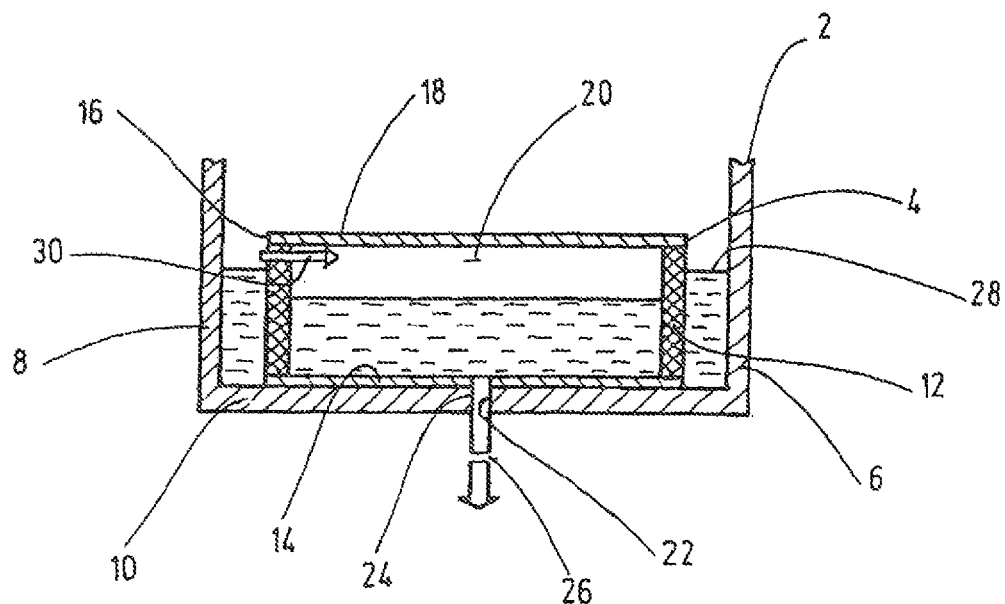
FIG. 2 is a highly simplified, functional side view in section of the device of FIG. 1, wherein the filling level height is located below the upper edge of the filter element.

The invention is described below based on an example that is provided for the suction filtration of an aqueous urea solution, as is known under the name "Adblue", and that can be used for exhaust gas after-treatment systems of internal combustion engines. The invention is based on the relevant prior art documented in WO 2011/124637 A1, as is represented in FIGS. 1 and 2, principally in the manner of simplified function sketches. The figures show a simplified representation of a tank 2, which holds a supply of the urea solution. A filter element 4 serving as a suction filter is disposed within the circular cylindrical interior of the tank 2 in such a manner that the filter element forms an inner cylinder. The filter element is disposed on the bottom 10 of the tank 2, concentric to the side walls 6 and 8 of the tank 2. The filter medium 12 of the filter element 4 extends from a base plate 14 lying on the tank bottom 10, to a cover plate 18 located at the upper edge 16 of the filter element 4. With base plate 14 and cover plate 18, the filter medium 12 delimits an inner filter cavity 20 forming the clean-side during the filtration process. Located on the base plate 14 is a suction connection 22, from which a cleaned urea solution can be discharged via an opening 24 in the tank bottom 10, as indicated with flow arrows 26.

FIG. 2, in contrast to FIG. 1, illustrates an operating state of the device of the prior art, in which the filling level height 28 in the tank 2 has fallen below the upper edge 16 of the filter element 4. As soon as this occurs during the operation of the device, a part of the filter medium 12 is exposed in the airspace of the tank 2, and air is able to enter, as is indicated with flow arrow 30, into the filter cavity 20 if a low pressure is present in filter cavity 20 in comparison to the airspace of the tank 2. So long is this is not the case, urea solution can flow according to the geodetic pressure, via the wet part of the filter medium 12 into the filter cavity 20, and exit via the suction connection 22. However, in the event that during operation the volume flow flowing out via the filter medium 12 falls to less than the possibly required suction volume of the associated pump, low-pressure develops in the filter cavity 20. Air is then suctioned out of the airspace of the tank 2 into the filter cavity 20. The filter cavity is suctioned empty of the clean-side urea solution, and the suctioned air is conveyed within the system. Consequently, safe operation is guaranteed only if the filling level height 28 remains above the element upper edge 16, which means that not the entire fill quantity of the tank is usable.

FIGS. 3 through 6 show the functionality of the device according to the invention, which differs from the prior art shown in FIGS. 1 and 2. In the invention, the filter element 34, which is disposed on the bottom 10 of the tank 2, as in the prior art shown in FIGS. 1 and 2, and is provided for suction filtration, has a filter medium 32, which is air-impermeable for low suction pressures. Further unlike the prior art, the suction connection 22 in the exemplary embodiment shown in FIGS. 3 through 6 is not located at the lower base plate 14 of the filter element 34. Rather, suction connection 22 is located at the upper cover plate 18. FIG. 3 illustrates a state of the device prior to start-up of the system and when filling the tank 2 to a filling level height 28 above the filter element 34. A quantity of air initially located in the filter cavity 20 before a start-up of the downstream pump device remains enclosed in the filter cavity 20 due to the air-impermeability of the filter medium 34. During the filling process, an overpressure then develops due to geodetic pressure of the urea solution in the filter cavity 20 surrounding the filter element 34, such that merely a low bottom layer 36 of inflowing urea solutions is formed, above which a quantity of air is located, see FIG. 3. If, starting from the state shown in FIG. 3, the system is put into operation, this quantity of air is then discharged out of the filter cavity 20 by the associated pump, see arrow 38.

To carry out a ventilation operation in the head-side arrangement of the suction connection 22 by the pump device, for example by a self-ventilating pump, the entire air content is discharged from the filter cavity 20, until the cleaned fluid initially forming only the bottom layer 36 in the cavity, has risen to the level of the suction connection 22. The filter element 34 is now free of air, and the device is ready for operation. This state is shown in FIG. 4.

FIGS. 5 and 6 show further phases of operation with a filling level height 28 lowered to different degrees. The filter cavity 20 remains filled completely with the cleaned urea solution, i.e. free of air, due to the air-impermeability of the filter medium 34. Therefore, the entire fill quantity of the tank 2 can be used without the danger of air entering into the system. FIG. 6 shows the state of the practically completely emptied tank 2.

While the invention is described above based on a device provided for the suction filtration of an aqueous urea solution (Adblue), the invention can be applied equally advantageously for other fluids, for which a suction filtration absent the danger of air entry is required. As already mentioned, the ventilation process can be carried out automatically subsequent to a filling. A melt-blown fiber material can be advantageously used as a filter medium 32, particularly suited for the invention. Such a filter medium 32, having a wall thickness of approximately 5 mm and a filter fineness in the range of 10 μm, is distinguished by a high capillary effect, such that even with only partial wetting with a fluid, such as an aqueous urea solution, the urea solution is completely sucked full over the entire length of the filter medium is thus air-impermeable for the relevant low suction pressures. The suction filtration occurs by a respective suction pump (not shown) connected to the suction connection 22. Downstream pump devices may be provided as pressure boosters to generate desired operating pressures, for example, injection pressures for Adblue applications.

While one embodiment has been chosen to illustrate the invention, it will be understood by those skilled in the art that various changes and modifications can be made therein without departing from the scope of the invention as defined in the claims.

The invention claimed is:

1. A device for suction filtration of fluids, the device comprising:
   a tank storing a fluid to a filling level height corresponding to a part of a filling volume of said tank and having a bottom;
   a filter element disposed in said tank, said filter element having a filter medium separating contents of said tank from a clean-side inner filter cavity inside said filter medium and extending from said bottom of said tank to the filling level height; and
   a suction connection on said filter cavity discharging cleaned fluid from said filter cavity by suction pressures corresponding to system operating pressures said filter medium being air-impermeable within a range of the system operating pressures and the suction pressures, said suction connection being arranged at an end of said filter cavity spaced from said bottom of said tank.

2. A device according to claim 1 wherein
said suction connection is disposed at an upper end of said filter cavity remote from said bottom of said tank.

3. A device according to claim 1 wherein
said filter medium comprises melt-blown fiber material.

4. A device according to claim 3 wherein
said fiber material has plastic fibers.

5. A device according to claim 4 wherein
said plastic fibers are PA 66.

6. A device according to claim 1 wherein
said filter medium has a wall thickness in a range of 2 mm to 10 mm and a fineness of 5 μm to 30 μm.

7. A device according to claim 1 wherein
said filter medium has a wall thickness of 5 mm and a fineness of 10 μm.

8. A device according to claim 1 wherein
said fluid is a urea solution for exhaust gas after treatment systems.

9. A device for suction filtration of fluids, the device comprising:
a tank storing a fluid to a filling level height corresponding to a part of a filling volume of said tank and having a bottom;
a filter element disposed in said tank, said filter element having a filter medium separating contents of said tank from a clean side inner filter cavity inside said filter medium and extending from said bottom of said tank to the filling level height, said filter medium having melt-blow fiber material of PA 66 plastic fibers and having a filter fineness in a range of 5 μm to 30 μm; and
a suction connection on said filter cavity discharging cleaned fluid from said filter cavity by suction pressures corresponding to a system operating pressures, said filter medium being air-impermeable with a range of suction pressures.

10. A device according to claim 9 wherein
said filter fineness is 10 μm.

11. A device according to claim 9 wherein
said suction connection is disposed at an upper end of said filter cavity spaced from said bottom of said tank.

12. A device according to claim 9 wherein
said filter medium has a wall thickness in a range of 2 mm to 10 mm and a fineness of 5 μm to 30 μm.

13. A device according to claim 9 wherein
said filter medium has a wall thickness of 5 mm and a fineness of 10 μm.

14. A device according to claim 9 wherein
said fluid is a urea solution for exhaust gas after treatment systems.

* * * * *